July 17, 1951      F. ROHR      2,561,230
SWINGING AXLE ASSEMBLY FOR TRAILERS
Filed Feb. 13, 1946
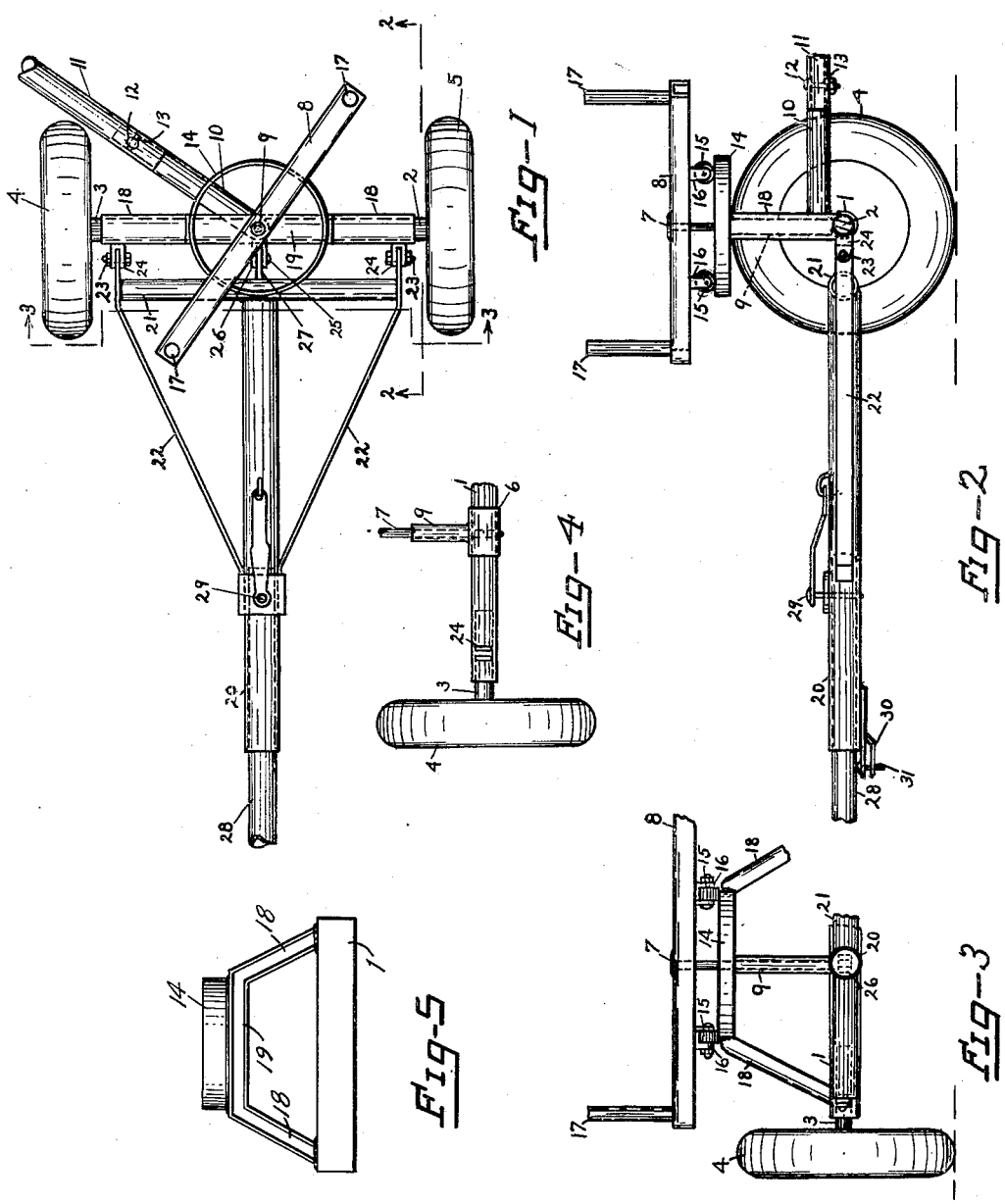
INVENTOR.
Fred Rohr,
BY
Bush & Bush,
His Attorneys.

Patented July 17, 1951

2,561,230

UNITED STATES PATENT OFFICE 2,561,230

SWINGING AXLE ASSEMBLY FOR TRAILERS

Fred Rohr, Alexis, Ill.

Application February 13, 1946, Serial No. 647,335

1 Claim. (Cl. 280—116)

My invention relates to improvements in running gears and hitches for trailers and is particularly applicable to tractor-drawn types.

The objects of my invention are to provide an improved front axle reach and bolster assembly for trailers, to provide improved means for turning the front wheels, improved means for supporting the front bolster and facile means for changing from a long tongue to a short tongue. Other objects will appear from the description.

My invention is illustrated in the accompanying drawings, in which—

Figure 1 is a top or plan view of the front axle assembly, bolster and front axle;

Figure 2 is a vertical section on the line 2—2 of Figure 1;

Figure 3 is a detail showing a modification of applicant's invention with the bolster rollers running upon the circle and with the diagonal channel beams supporting the circle;

Figure 4 is a detail showing the reenforcing sleeve on the axle and the sleeve upon the kingbolt;

Figure 5 is a detail showing unitary diagonal supporting arms or risers 18 and crossbar 19 formed of an eye-beam with the circle or fifth wheel spot-welded thereon.

Similar numerals refer to similar parts throughout the several views.

My invention includes a front axle 1 having short stub axles 2 and 3 inserted in the ends thereof and preferably welded to the axle 1.

Wheels 4 and 5 are mounted upon the outer ends of the stub axles in the usual way and preferably are provided with roller bearings of any well known type.

The middle of the axle 1 is reenforced by a tubular sleeve 6 which may be welded to the axle 1 or secured by a pressfit or other suitable means.

A king bolt 7 has its upper end united to or mounted in a bolster 8 and extends downwardly therefrom through a tube or sleeve 9 and the axle 1. Near its lower end, the sleeve 9 is rigidly united by welding or other suitable means to the front section 10 of a rearwardly extending tubular reach. The front section 10 of the reach extends into the front end of a tubular rear section 11 of the reach and is secured therein by a bolt 12. The bolt 12 extends through the section 10 and through circumferential slots 13 in the rear section whereby relative rotational movement of the two reach sections is permitted within the limits of the slots 13—13.

The bolster 8 is supported by a fifth wheel or circle 14 which forms the track upon which rolls 15 travel. The rolls 15 are pivotally mounted in the lower ends of the bars 16, the upper ends of which are welded to the under side of the top of the bolster 8.

The bolster 8 is preferably formed of channel iron with the flanges extending downwardly. At the outer ends of the bolster, uprights 17 are secured which act to hold a wagon box or body of the trailer or other vehicle in place upon the bolster, but are spaced far enough apart to allow the necessary play or freedom of movement of the body when the wheels are not standing on a level.

The fifth wheel or circle 14 may be supported by diagonal arms or risers 18 formed of channel iron, which may be welded to the circle 14, but I prefer to form the risers 18 integral with a crossbar 19 and preferably formed by an eye-beam bent as illustrated in Figure 5 so as to raise the bolster a given distance above the axle 1. The lower ends of the risers 18 are united to the axle, preferably by welding, but other means of attachment may be utilized to unite the risers 18 to the axle 1 and to unite the crossbar 19 to the circle 14.

The front wheels are provided with a short tubular tongue 20 the rear end of which is welded to a crossbar 21 preferably tubular. Diagonal brace rods 22—22 extend from the ends of the crossbar forwardly to the tongue. The rear end of the brace rods 22—22 are pivotally secured to the axle 1 by pivot bolts 23—23 secured in lugs 24—24 welded or otherwise united to the axle 1. The middle of the crossbar is pivotally united to the middle of the axle 1 by a pivot bolt 25 passing through lugs 26 and 27 united respectively to the axle 1 and to the crossbar 21.

A tubular extension tongue 28 is arranged to be united to the tubular short tongue by having the rear end of the extension inserted a suitable distance into the front end of the short tongue 20 and may be secured in place by a bolt 29.

When it is desired to have the trailer drawn by a team of horses, the doubletree may be secured in place by the bolt 29 which passes through the long and short tongues to secure them together, and when it is desired to draw the trailer by the short tongue alone, the hitch may be made to the arms 30 and bolt 31.

Either the short or the long tongue may be attached to and drawn by a tractor or by a team of horses.

In using a corn picker, it is necessary to have the trailer wagon which receives the ears of corn from the picker some distance to the rear of the corn picker and the long tongue permits the necessary separation for that purpose.

When desired to take away the loaded wagon, the long tongue can be unhitched from the short tongue by merely removing the bolt 29 holding the two together. The loaded wagon can then be turned sharply to one side and drawn away by the hitch to the bolt 31 and another trailer wagon carrying my assembly can then be driven up and connected to the long or extension tongue, thus facilitating replacement of a loaded wagon by an unloaded one.

Various other cases will arise where the separable long tongue will facilitate operation.

The elevation of the front bolster and the arrangement of the two part reach allows the tongue to be turned almost at right angles to the line of travel of the machine and this permits turning the trailer practically at a right angle. The bolster being carried on rolls and the use of roller bearings on the stub axles, make it very easy to turn the tongue in either direction and also facilitates turning the trailer by backing the front wheels at an angle.

In fact, the rear wheels may be blocked and the trailer turned at a right angle to its previous course by backing the front wheels at an angle.

Various modifications may be made in the form, proportions and material of the different parts of my apparatus without departing from the spirit of my invention and I do not limit my claim to the precise forms which are shown in the drawings.

I claim:

In a front trailer assembly a front axle, stub axles united to the front axle and on which wheels are mountable, an I-beam support carried by the front axle having an upraised middle portion spaced therefrom and parallel thereto, a fifth wheel or circle mounted on the support, a bolster mounted upon the circle and revolvable thereon, a king-bolt having its upper end united to the middle portion of the bolster and extending downwardly through bores formed in the support and axle, and a sleeve surrounding the king-bolt between the axle and the support to which a reach may be united.

FRED ROHR.

REFERENCES CITED

The following references are of record in the file of this patent:

UNITED STATES PATENTS

| Number | Name | Date |
|---|---|---|
| 360,009 | Goodyear | Mar. 29, 1887 |
| 639,178 | Maddox | Dec. 12, 1899 |
| 666,610 | Sloan | Jan. 22, 1901 |
| 810,546 | Kreiziger | Jan. 23, 1906 |
| 1,088,189 | Thompson | Feb. 24, 1914 |
| 1,243,401 | Griswold | Oct. 16, 1917 |
| 1,743,381 | Norman | Jan. 14, 1930 |
| 1,782,330 | Werlich | Nov. 18, 1930 |
| 2,361,869 | Randall | Oct. 31, 1944 |